Oct. 30, 1923.

O. W. SCURLOCK ET AL 1,472,569

MOIST HEATER

Filed Dec. 26, 1922

Olin W. Scurlock  Inventors
Leo A. Gilbreath

By John M. Spellman

Attorney

Patented Oct. 30, 1923.

1,472,569

UNITED STATES PATENT OFFICE.

OLIN W. SCURLOCK AND LEO A. GILBREATH, OF DALLAS, TEXAS.

MOIST HEATER.

Application filed Deember 26, 1922. Serial No. 609,125.

*To all whom it may concern:*

Be it known that we, OLIN W. SCURLOCK and LEO A. GILBREATH, citizens of the United States, residing at Dallas, in the county of Dallas and State of Texas, have invented certain new and useful Improvements in Moist Heaters, of which the following is a specification.

This invention relates to an adjustable air moistening attachment to heaters, and in that connection more especially to gas heaters for the purpose of properly moistening the heat arising from said heaters before it passes out into the room.

The invention consists of a water receptacle of suitable material, open at top, and removable for refilling and cleaning from the back or sides of the heater, said receptacle being so situated that the heated air in passing through the stove or heater travels over the surface of the water in the receptacle and is moistened thereby.

A feature of the invention is the adjustable means by which the volume of heat is regulated in the chamber containing the receptacle so that if desired the heat may be shut off entirely from the aforesaid chamber or allowed to pass entirely through it.

It should be understood that the construction of the water receptacle, a suitable insulating chamber and the regulating damper may vary to be adapted to different styles of heaters without same effecting the principle of the invention.

Other novel features will be set forth in the following description taken in connection with the drawings attached hereto as follows:—

Figures 1, 2:
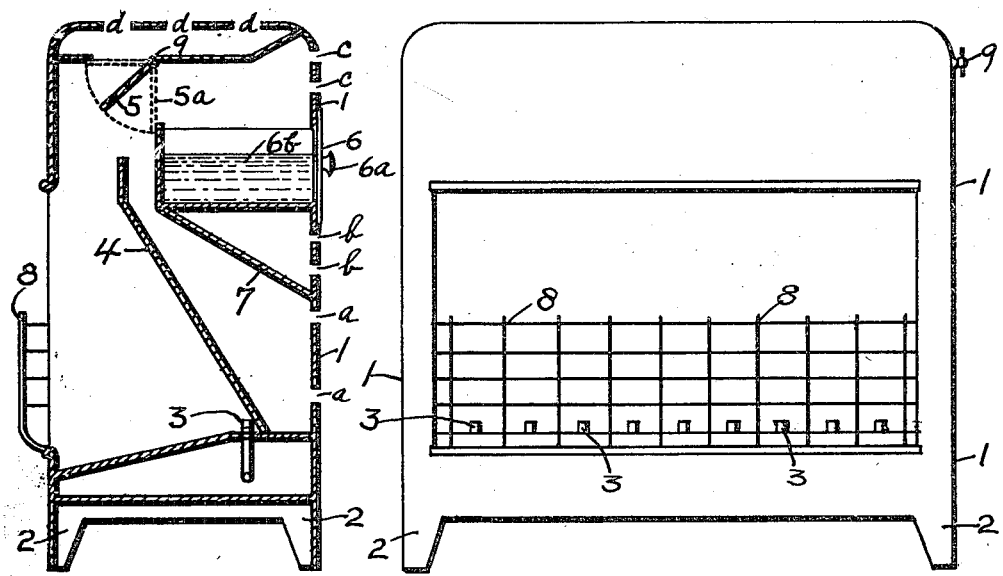
Figure 1 represents a lateral cross section of the invention.
Figure 2 represents a front elevation of the invention.

In Figure 1 the body 1 of the heater is shown resting on base 2, heat arising from burner 3 passes over asbestos back 4, and through openings $5^a$, controlled by a damper 5, then passes over water $6^b$, in receptacle 6 and thence through ports $c$—$c$ to the atmosphere of the room. Ports $a$—$a$ and $b$—$b$ assist in vaporization of water $6^b$, in chamber 6, and at the same time prevent the water from becoming too greatly heated by allowing fresh, cool air to enter the space beneath the water chamber and the space behind the asbestos back 4. Ports $d$—$d$ in the top of the heater allow the desired amount of dry air to escape. Handle means $6^a$, allow receptacle 6 to be drawn out of the heater for refilling. 8 represents the grill or guard on the front of the heater. The space between partition 7, shown in Figure 1, and the bottom of receptacle 6, has a circulation of air therethrough, same passing in and out of the ports $b$—$b$, said circulation keeping the bottom of the receptacle 6 cool, thus preventing excess evaporation of the water therein, said space or chamber serving as a heat insulating means to the receptacle.

In Figure 2 a handle 9 operates the damper 5 (shown in Figure 1) the latter being held in place after adjustment by friction or other suitable holding means.

Figure 3:
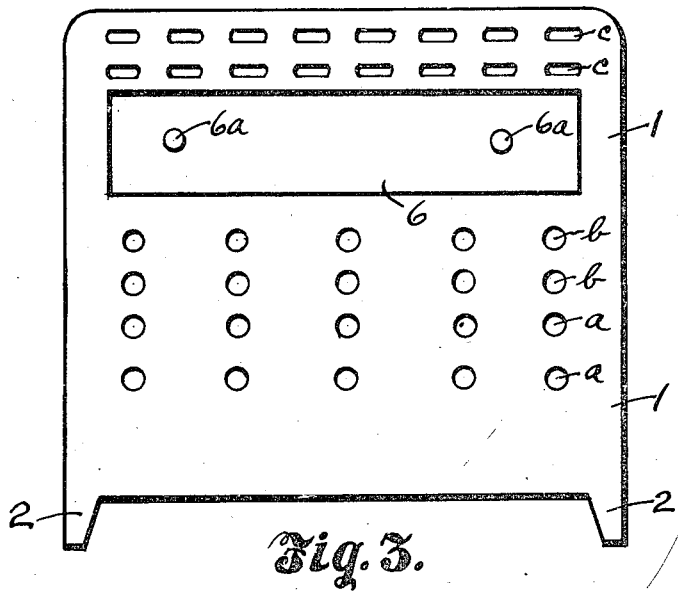
Figure 3 represents a rear elevation.

In Figure 3 the ports or openings in the back of the heater are shown, and also the receptacle means 6 with handle $6^a$, thereon for removing same.

What is claimed is:

1. In a heater, a water receptacle, a burner, a damper regulating the passage of heated air over the receptacle, means for adjusting the damper, and a cool air chamber below the receptacle.

2. In a heater, a burner, a removable water receptacle, a cool air chamber below the receptacle, ports in the rear wall of the heater to allow cool air entrance therein, a damper and means for adjusting same to regulate the passage of heated air over the water in the receptacle.

In testimony whereof we have signed our names to this specification.

OLIN W. SCURLOCK.
LEO A. GILBREATH.